May 13, 1969     M. T. LAUBACH     3,443,551
DIESEL ENGINE PROPANE ACCESSORY
Filed Dec. 7, 1966
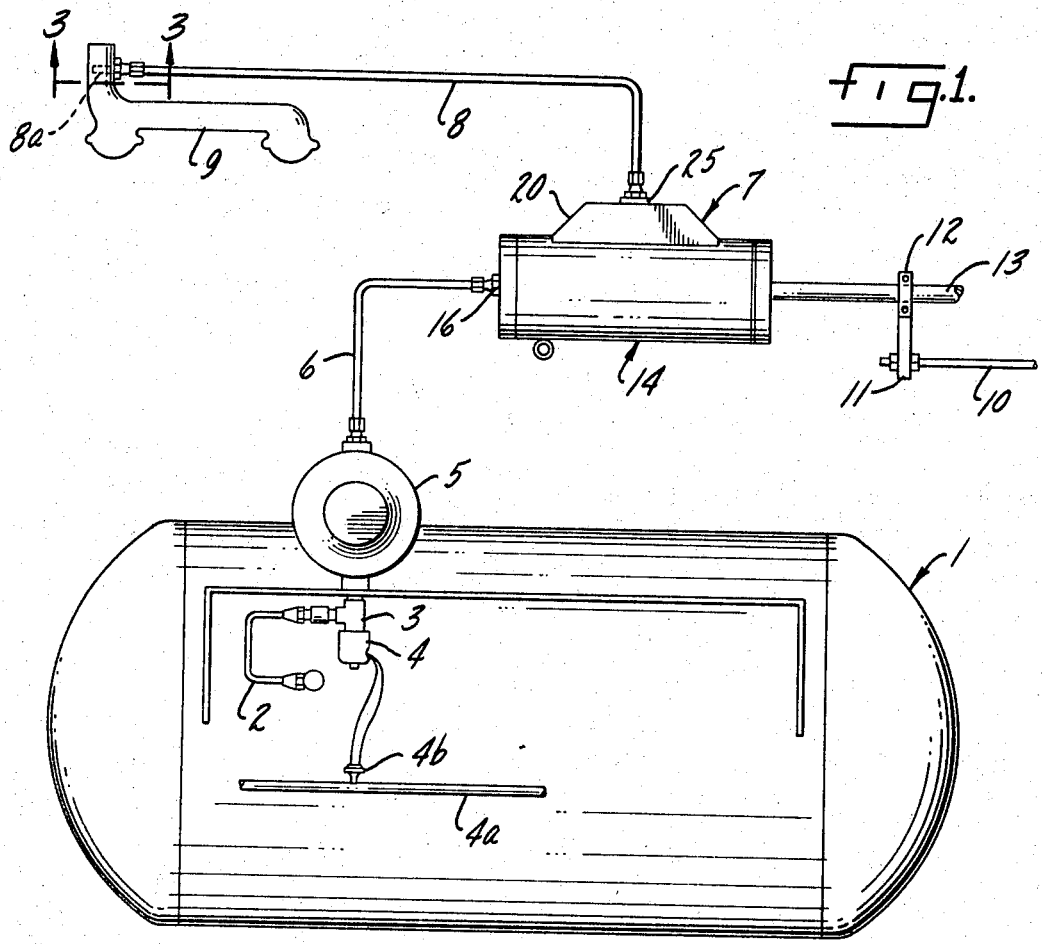
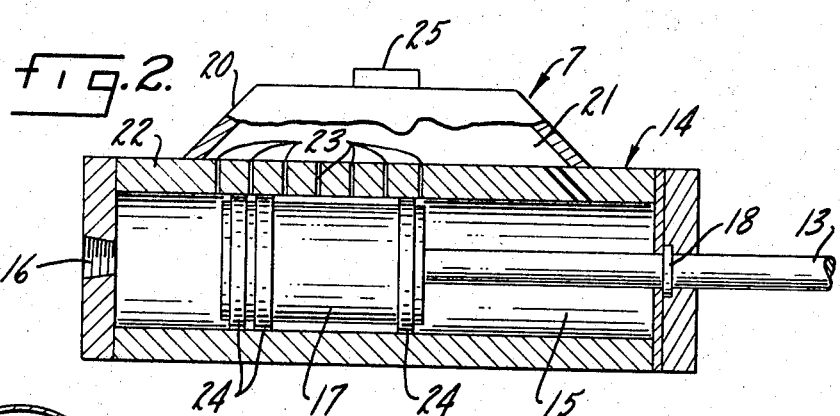
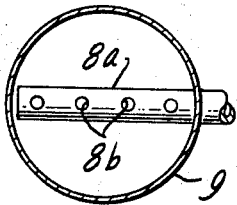
INVENTOR.
Marvin T. Laubach,
BY Parker & Carter
Attorneys.

United States Patent Office 3,443,551
Patented May 13, 1969

3,443,551
DIESEL ENGINE PROPANE ACCESSORY
Marvin T. Laubach, Henke's Trailer Court,
Milford, Ill. 60953
Filed Dec. 7, 1966, Ser. No. 599,861
Int. Cl. F02b 43/10
U.S. Cl. 123—27                4 Claims

ABSTRACT OF THE DISCLOSURE

A means and method of operating a diesel engine including a metering valve linked to the throttle and delivering propane at low pressure to the engine intake manifold in response to throttle position, and the method of delivering propane vapor at 100 p.s.i. to a regulator delivering said propane vapor from the regulator to the metering valve at 6 ounces per square inch, varying the volume of said propane vapor delivered from the metering valve to the engine air intake manifold in direct response to the position of the engine throttle.

---

This invention relates to the field of diesel engines and has particular relation to a system and structure for introduction of propane fuel to a diesel engine.

One purpose of the invention is to provide a system and structure effective to introduce propane to a diesel engine at various and substantially all power settings of said engine.

Another purpose is to provide a system and structure for introduction of propane to a diesel engine in correlation with the power setting of said engine.

Another purpose is to provide a system and structure for an introduction of propane to a diesel engine without danger of injury to said engine.

Another purpose is to provide a system and structure for an introduction of propane to a diesel engine effective to reduce the consumption of diesel fuel by said engine.

Another purpose is to provide a system and structure for an introduction of propane to a diesel engine effective to increase the horsepower delivered by said engine.

Another purpose is to provide a system and structure for an introduction of propane to a diesel engine effective to reduce the exhaust smoke in unburned diesel fuel.

Another purpose is to provide a system and structure for an introduction of propane to a diesel engine effective to reduce combustion chamber deposits and to increase the cleanliness and life of crankcase and lubricating oil of said engine.

Another purpose is to provide a system and structure for an introduction of propane to a diesel engine effective to avoid abrupt increases or decreases in horsepower in response to introduction and removal of propane from said engine.

Another purpose is to provide a system and structure for an introduction of propane to a diesel engine effective to introduce propane at lower pressures and minimum quantities per unit of horsepower increase.

Another purpose is to provide a system and structure for an introduction of propane to a diesel engine effective to accomplish the foregoing objectives while maintaining combustion temperatures within established safe limits.

Other purposes will appear from time to time during the course of the specification and claims.

The invention is illustrated more or less diagrammatically in the accompanying drawings, wherein:

FIGURE 1 is a schematic system view;

FIGURE 2 is a detail view on an enlarged scale of a control element in the invention; and FIGURE 3 is a detail view in section, on an enlarged scale, of a propane delivery structure taken on line 3—3 of FIGURE 1.

Like parts are indicated by like numerals throughout the specification and drawings.

Referring now to the drawings, the numeral 1 generally indicates a tank or suitable container for a supply of propane gas. Propane from the tank 1 flows through conduct 2 to a control valve fitting 3. Indicated at 4 is a shutoff or lockout valve controlling flow of propane through fitting 3 to a regulator 5. An engine oil pressure line is shown in part at 4a and an oil pressure-responsive switch 4b communicates therewith. Electrical conductors 4c connect switch 4b to valve 4. The propane gas flows from regulator 5 through a conduit 6 to a flow-control or metering member indicated generally at 7. From the member 7 the conduit 8 conducts propane gas to the intake manifold of a diesel engine, such manifold being indicated generally at 9. As best seen in FIGURE 3, the closed end portion 8a of conduit 8 extends well into manifold 9 and has a plurality of openings 8b longitudinally aligned thereon, the openings 8b being directed downstream of the flow in manifold 9. Shown schematically at 10 is a throttle accelerator rod positioned for manual operation by the vehicle operator. The rod 10 actuates throttle linkage 11 which is in turn connected, as indicated at 12, to a rod 13 extending from member 7.

Referring now to FIGURE 2, the member 7 includes a housing 14 defining therewithin a chamber 15. A fuel inlet 16 is formed in an end wall of housing 14 for delivery of propane gas to chamber 15. Reciprocal within chamber 15 is a piston valve member 17. The shaft 13 is secured to piston 17 and extends through the opposite end wall of housing 14, a suitable seal 18 being provided between the shaft 13 and said end wall. A dome member or subhousing 20 is secured to housing 14 and defines therewithin a type of plenum or subchamber 21. The circumferential wall 22 of housing 14 is apertured at a plurality of points therealong, as indicated generally at 23, to communicate chamber 15 through said aperture with subchamber 21. It will be observed that the piston 17 carries seal members 24 in engagement with the inner surface of the circumferential wall 22 for closing communication between chambers 15 and 21 through apertures 23 and for progressively opening said communication as the piston 17 is moved within chamber 15. An outlet 25 is provided for attachment of a suitable conduit, such as conduit 8, to the subhousing 20 for delivery of propane gas from chamber 21 to intake manifold 9.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

Oil pressure-responsive switch 4b is set for actuation in response to engine oil pressure above that obtainable when the engine is turned over without starting and below idling oil pressure. A setting of twenty pounds has been found effective to insure against opening of valve 4 and delivery of propane prior to engine start while insuring delivery of propane at engine idle.

With the engine at idle and valve 4 open, propane gas is fed from tank 1 to regulator 5 at approximately one hundred pounds. The regulator 5 reduces said pressure to approximately six ounces, at which level the propane gas is then delivered through conduit 6, for example, to the chamber 15 of member 7 at approximately said six-ounce pressure. With the throttle rod 10 in throttle-closed position, the piston 17 is at its full travel in one direction within chamber 15, that is to the left as the parts are shown in the drawings. In such position, all of the orifices 23 are closed and no propane gas may enter the intake manifold of the diesel engine. With the throttle rod 10 in engine-idle position the piston 17 will have been moved within chamber 15 to the right, as the parts are shown in the drawings, a distance sufficient to expose one of the orifices 23. As a consequence, a limited amount of propane gas will be delivered to chamber 21 and from thence through conduit 8 to the intake manifold. The orifice 23 is, of course, dimensioned to provide for a predetermined safe quantity of propane gas delivered therethrough. As the throttle is moved toward open position the piston 17 will be automatically moved further to the right, as the parts are shown in the drawings, exposing additional orifices 23. For example, the movement of the throttle to a position approximating one-third open might expose the first three such orifices in the direction of movement of the piston 17. Positioning the throttle at its two-thirds open position might expose the first five such orifices and when the throttle is at full open position, all of the orifices provided in the wall 22 of housing 14 will be exposed.

As the throttle is moved in reverse direction from full open toward full closed position the piston 17 will, of course, be moved in the opposite direction, or to the left as the parts are shown in the drawings, progressively closing more of the orifices 23 until all are closed when the throttle is in closed position.

Propane gas delivered through conduit 8 enters the diesel air stream through apertures 8b for substantially uniform mixing therewith prior to entry into the engine cylinders. Due to line loss enroute to manifold 9 the propane at apertures 8b may be at a pressure approximating zero, said stream serving to draw propane, as required, through said apertures as said stream flows about and beyond conduit end position 8a. A pressurized propane delivery is provided, however, to a point adjacent apertures 8b and the vacuum or suction effect of manifold 9 is not employed to draw propane from a remote point, such as regulator 5.

Thus a progressively increasing quantity of propane gas will be delivered to chamber 21 and thence to intake manifold 9 as the throttle of the engine is moved progressively toward full open position and the quantity of propane gas so deivered will be reduced as the throttle is moved from open position toward idle or closed position.

Should control valve piston member 17 remain open with the engine operating at idle, through inadvertent separation of linkage 12, for example, the engine will not suffer injury or destruction since the low, six ounce pressure employed, coupled with the reduced suction in manifold 9, insures against delivery of excess propane to the engine. The same fail-safe feature obtains if seals 24 should become ineffective with piston 17 at idle position.

Since the system is independent of temperatures in manifold 9, delivery of unwanted propane in response to a manifold heated beyond normal temperatures by previously delivered propane is avoided.

Experience indicates that horsepower is increased an average of at least 20 percent across the power setting spectrum of the diesel engine and at all r.p.m. thereof. Expenditure of propane and saving of the more expensive diesel fuel varies in relation to engine size. For example, the introduction of approximately one and a half gallons of propane per hour to a 405 cubic inch displacement engine produced a 25 percent increase in horsepower and a saving of one and a half gallons per hour of diesel fuel. The introduction of propane and saving of diesel fuel on a one-for-one basis in that particular instance was fortuitous but the relationship, while varying between engines, operating conditions, etc., will produce a substantial cost saving while producing increased horsepower.

The horsepower produced by a diesel engine may, of course, be increased by introduction of greater quantities of diesel fuel, but such introduction is limited by the greater cost and by combustion temperature limitations. A typical diesel engine, for example, may have an upper combustion temperature limit of 1250 degrees. Such engine may be typically set to produce one hundred horsepower at 980 degrees combustion temperature. The introduction of propane to such an engine by the structure and method herein disclosed produced one hundred and twenty-five horsepower, a 25 percent increase, at a combustion temperature of 1180 degrees, an increase of 200 degrees or approximately 20.4 percent, which is within the safe limits of the engine.

There is claimed:

1. For use with a diesel engine installation having a diesel engine, a throttle and an intake manifold, a supply of propane under pressure, a metering member, conduit connections communicating said supply with said metering member and said metering member with said intake manifold, said metering member including a valving element movable therein, a linkage connecting said valving element with said throttle for movement therewith, said metering member including a metering orifice structure controlled by said valving element whereby a predetermined movement of said throttle toward its open position produces a corresponding predetermined movement of said valving element in one direction in response thereto to provide for correspondingly greater predetermined flow of propane through said metering orifice structure, said metering member including a housing defining a chamber and a propane inlet adjacent one end of said chamber, said valving element including a piston reciprocal within said chamber toward and away from said inlet and sealingly engaging the longitudinal wall of said chamber and said metering orifice structure including at least one opening positioned in the longitudinal wall of said chamber for opening and closing by said piston.

2. The structure of claim 1 wherein said metering member includes a subhousing secured to said first-named housing and defining a subchamber communicating with said metering orifice structure and an outlet formed in said subhousing for communicating said subchamber with the conduit connection communicating with said intake manifold.

3. The structure of claim 1 wherein said metering orifice structure includes a plurality of apertures formed in and spaced along said longitudinal wall of said housing.

4. The structure of claim 1 wherein said metering member includes a shaft secured to said piston and extending outwardly of said housing and operatively connected to said linkage.

References Cited

UNITED STATES PATENTS

| | | |
|---|---|---|
| 1,858,824 | 5/1932 | Heidelberg. |
| 2,400,247 | 5/1946 | Miller et al. |
| 2,489,405 | 11/1949 | Doyle. |
| 2,518,400 | 8/1950 | Thompson. |
| 2,767,691 | 10/1956 | Mengelkamp et al. |
| 2,773,491 | 12/1956 | Reddy _____ 123—120 |
| 2,780,209 | 2/1957 | Renken. |
| 2,817,324 | 12/1957 | Sievers _____ 123—120 |
| 3,353,520 | 11/1967 | Haag. |

LAURENCE M. GOODRIDGE, *Primary Examiner.*

U.S. Cl. X.R.

123—120